United States Patent Office 3,113,968
Patented Dec. 10, 1963

3,113,968
1-PHENYL, 1-HYDROXYALKYL, 3,3-DIALKYL-UREAS
Henry J. Gerjovich and Raymond W. Luckenbaugh, Wilmington, Del., assignors to E. I. du Pont de Nemours and Company, Wilmington, Del., a corporation of Delaware
No Drawing. Filed Sept. 10, 1959, Ser. No. 839,061
1 Claim. (Cl. 260—553)

This invention relates to certain 1-aryl-1-hydroxy-alkyl-3-alkylureas.

The need for outstanding herbicides remains an important factor in the agricultural and industrial economies of the world today. Particularly needed are herbicidal chemical compounds that possess highly specific activity against certain species of undesirable vegetation that for some unknown reason are immune from attack by convention herbicides at commercially economic dosages.

We have discovered a narrow class of novel compounds which we have found to possess a unique type of herbicidal action. Our compounds have exhibited a selectivity for killing germinating seedlings, especially broadleaf weeds, whereas they are relatively non-toxic to mature plants. Because of this outstanding selectivity for germinating seedlings, they are well suited for usage in the control of germinating weeds in established crop lands.

The compounds within the scope of the present invention are represented by the following formula:

(1)

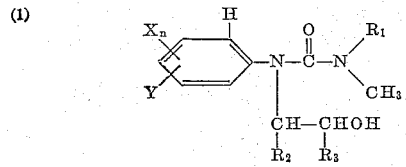

wherein X is halogen; Y is hydrogen, alkyl of less than 5 carbon atoms, or nitro; $n$ is a positive integer less than 3, that is 1 or 2; $R_1$ is alkyl of less than 5 carbon atoms; and $R_2$ and $R_3$ are hydrogen or methyl, with the proviso that at least one of $R_2$ and $R_3$ is hydrogen.

The compounds of the present invention can be prepared by conventional routes. For example, the preferred tetrasubstituted ureas represented by the above formula can be prepared by the following type reaction:

(2)

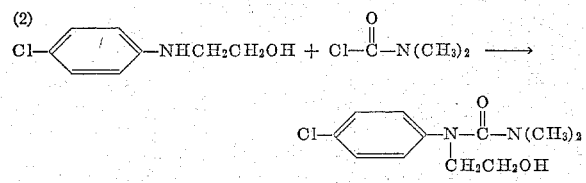

The process illustrated by this equation is suitably carried out by addition of the beta-arylaminoethanol to a solution of the carbamoyl chloride in dry pyridine. The reaction mixture is warmed for several hours. The resultant mixture is diluted with water and the product extracted with methylene chloride.

The reaction can also be carried out in an inert liquid medium such as xylene, toluene, dioxane and the like in the presence of an acid acceptor such as triethylamine, pyridine and other organic bases.

The temperature of the reaction is not critical. Ordinarily, temperatures in the range of 0° to 100° C. are satisfactory.

The intermediate beta-arylaminoethanols can be obtained in high yields by the method of Adams and Segur, J. Am. Chem. Soc. 45, 785 (1923). Arylamines are condensed with chloroethyl chloroformate followed by treatment of the resultant carbamates with excess alkali.

Another possible method of preparation of these beta-arylaminoethanols consists of reaction of ethylene oxide or propylene oxide with arylamine.

The tetra-substituted ureas can also be prepared by the following type reaction:

(3)

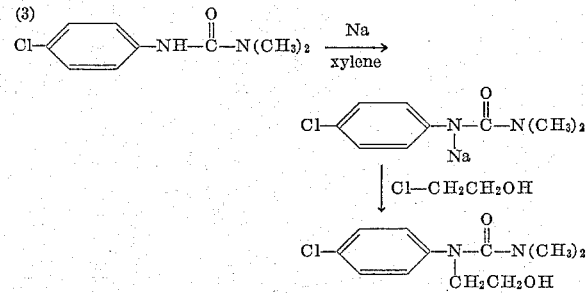

An equal molar equivalent of sodium metal dissolved in an inert solvent is added to the tri-substituted urea suspended in the same solvent. The chloro alcohol is added dropwise to this suspension of the sodium salt of the urea. Evaporation of the solvent and washing the crystalline residue with water yields crude product.

Illustrative compounds of this invention which are useful in the herbicidal compositions and methods are the following:

1-(p-chlorophenyl)-1-(2-hydroxyethyl)-3,3-dimethylurea,
1-(3,4-dichlorophenyl)-1-(2-hydroxyethyl)-3,3-dimethylurea,
1-(2-hydroxyethyl)-3,3-dimethyl-1-(3-methyl-4-chlorophenyl)urea.
1-(2-hydroxyethyl)-3,3-dimethyl-1-(3-nitro-4-chlorophenyl)urea,
1-(p-chlorophenyl)-3-ethyl-1-(2-hydroxyethyl)-3-methylurea,
1-(3,4-dichlorophenyl)-1-(2-hydroxypropyl)-3,3-dimethylurea,
1-butyl-3-(3,4-dichlorophenyl)-3-(2-hydroxyethyl)-1-methylurea,
1-(p-chlorophenyl)-1-(1-methyl-2-hydroxyethyl)-3,3-dimethylurea,
1-butyl-3-(3,4-dichlorophenyl)-3-(2-hydroxypropyl)-1-methylurea,
1-(p-bromophenyl)-1-(2-hydroxyethyl)-3,3-dimethylurea,
1-(p-fluorophenyl)-1-(2-hydroxyethyl)-3,3-dimethylurea.

These compounds have some solubility in water but are relatively more soluble in solvents such as xylene, benzene, anisole, acetone, and the like.

The conventional substituted urea herbicides, namely 3-(p-chlorophenyl)-1,1-dimethylurea (monuron) and 3-(3,4-dichlorophenyl)-1,1-dimethylurea (diuron), are extremely insoluble in water and most conventional solvents.

Herbicidal compositions of the invention are prepared by admixing the 1-aryl-1-hydroxyalkyl-3,3-dialkylureas of the present invention in herbicidally effective amounts with a conditioning agent of the kind used and referred to in the art as a pest control adjuvant or modifier to provide formulations adapted for ready and efficient application to soil or weeds (i.e., unwanted plants) using conventional applicator equipment.

Thus the herbicidal compositions or formulations are prepared in the form of solids or liquids. Solid compositions may be in the form of dusts which are compounded by admixing the 1-aryl-1-hydroxyalkyl-3,3-dialkylureas with finely divided solids, preferably talcs, natural clays, pyrophyllite, diatomaceous earth or flours such as walnut shell, wheat, redwood, soya bean, cottonseed flours and other inert solid conditioning agents or carriers of the kind conventionally employed in preparing pest control compositions in dust or powdered form. Preferably, however, solid formulations are either in the form of wettable powders or granules.

Wettable powders are made in the conventional manner by blending and grinding together 1-aryl-1-hydroxyalkyl-3-alkylureas, an inert grinding aid (such as attapulgite clay, diatomaceous silica, calcium silicates or synthetic fine silica), wetting and dispersing agents to produce a fine particled homogeneous powder which is readily suspended in water.

Granules may be prepared by spraying prepared granules of attapulgite clay with a solution of the urea in volatile solvent or alternatively by moistening a mixture of the urea and a binding clay, then granulating and drying.

Liquid compositions of the invention are prepared in the usual way by admixing 1-aryl-1-hydroxyalkyl-3-alkylureas with a suitable liquid diluent medium. With certain solvents such as alkylated naphthalene, dimethylformamide, and cresol, relatively high, up to about 35% by weight or more, concentrations of 1-aryl-1-hydroxyalkyl-3-alkylureas can be obtained in solution. Other liquids conventionally used in preparing liquid herbicidal compositions are for the most part less effective solvents.

The herbicidal compositions of the invention whether in the form of solids or liquids preferably also include a surface-active agent of the kind sometimes referred to in the art as a wetting, dispersing or emulsifying agent. These agents which will be referred to hereinafter more simply as surface-active agents cause the compositions to be easily dispersed in water to give aqueous sprays which for the most part constitute a desirable composition for application.

The surface-active agents employed can be of the anionic, cationic or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate, alkyl aryl polyether alcohols and other wetting, dispersing and emulsifying agents such as those listed in articles by McCutcheon in "Soap and Chemical Specialties," volume 31, Nos. 7–10 (1955).

Generally the surface-active agent will not comprise more than about 5 to 15% by weight of the composition depending, of course, upon the particular surface-active agent, the system in which it is placed, and the result desired, and in certain compositions, the percentage will be 1% or less. Usually the minimum lower concentration will be 0.1%.

The herbicidal compositions are applied either as a spray or as granules to the locus or area to be protected from undesirable plant growth, commonly called weeds, i.e., plants growing where they are not wanted. Such application can be made directly upon the locus or area and the weeds thereon during the period of weed infestation in order to destroy the weeds, but if desired the application can be made in advance of an anticipated weed infestation to prevent such infestation. Thus the compositions can be applied as aqueous foliar sprays but can also be applied as sprays directly to the surface of the soil. Alternatively, the pelleted or granular compositions can be broadcast directly on the plants or on the soil.

The active compound is, of course, applied in amount sufficient to exert the desired herbicidal action. The amount of the active 1-aryl-1-hydroxyalkyl-3-alkylureas present in the compositions as actually applied for destroying, preventing or controlling weeds will vary with the manner of application, the particular weeds for which control is sought, the purposes for which the application is being made, and like variables. In general, the herbicidal compositions as applied in the form of a spray or as granules will contain from about 0.5% to 85% by weight of 1-substituted phenyl-1-hydroxyalkyl-3,3-dialkylureas of this invention.

Fertilizer materials, other herbicidal agents, and other pest control agents such as insecticides and fungicides can be included in the herbicidal compositions of the invention if desired.

In order that the invention may be better understood, the following examples are given in addition to the examples already given above. The examples illustrate the preparation of the ureas of this invention, herbicidal formulations employing the compounds, herbicidal applications, and the results obtained. Parts are by weight unless otherwise specified and the numbers following tabulated ingredients in the examples represent parts by weight of the ingredients in the combination shown in such tabulation.

*Example 1*

Beta-(p-chlorophenyl)aminoethanol, 17.2 parts, is added rapidly to a stirred mixture of 15.8 parts of dry pyridine and 10.8 parts of dimethylcarbamoyl chloride. The solution turns to a dark, red wine color. The reaction is heated at 85° C. for two hours and then poured into 200 parts of water. The oil is extracted with methylene dichloride, washed with dilute hydrochloric acid and dried over magnesium sulfate. Evaporation of the solvent yields as a crude oil 1-(p-chlorophenyl)-1-(2-hydroxyethyl)-3,3-dimethylurea. Several recrystallizations from n-heptane yield pure compound, M.P. 87–88° C.

*Analysis.*—Calc'd for $C_{11}H_{15}N_2O_2Cl$: N 11.6%, Cl 14.6%. Found: N 11.4%, Cl 14.6%.

To test the herbicidal activity of this compound, it is applied as a pre-emergence herbicide at the rate of five pounds per acre onto soil plots seeded with broadleaf and grassy weeds. It is found that complete weed control is obtained by this treatment. Broadleaf species planted in plaster sand are killed at a rate of ¼ pound per acre. This shows that this compound possesses a high order of pre-emergence activity.

*Example 2*

Beta-(3,4-dichlorophenyl)aminoethanol, 55.0 parts, is reacted with a mixture of 42.4 parts of dry pyridine and 28.7 parts of dimethylcarbamoyl chloride by the procedure as outlined in Example 1. The pure crystalline product, 1-(3,4-dichlorophenyl)-1-(2-hydroxyethyl)-3,3-dimethylurea, has a melting point of 75–77° C. To test the herbicidal activity of this compound it is applied as a 1% spray on lamb's-quarters, rough pigweed and millet. It is found that this treatment gives control of these plants.

*Example 3*

1-(p-chlorophenyl)-1-(2-hydroxyethyl) - 3,3-dimethylurea is formulated to provide a water dispersible powder adapted for dispersion in water for application as a herbicidal spray. The water dispersible powder composition is made by intimately mixing the ingredients listed below using conventional mixing or blending equipment and then grinding the mixture to give a powder having an average particle size less than 50 microns.

| | |
|---|---|
| 1-(p-chlorophenyl)-1-(2-hydroxethyl)-3,3-dimethylurea | 75 |
| Fuller's earth | 23.75 |
| Sodium lauryl sulfate, 50% (wetting agent) | 1 |
| Methyl cellulose, 15 cps. (dispersing agent) | 0.25 |
| | 100 |

The water dispersible powdered composition described above is dispersed in water to give an aqueous spray composition containing one pound of 1-(p-chlorophenyl)-1-(2-hydroxyethyl)-3,3-dimethylurea for each 40 gallons of water. This aqueous spray composition is applied at a dosage of three pounds per acre of 1-(p-chlorophenyl)-1-(2-hydroxyethyl)-3,3-dimethylurea to an area planted with cotton seed, the spray application being made prior to emergence of the cotton plant seedlings. Almost complete prevention of weed growth is obtained. Excellent control of annual broadleaf and grass weeds such as pigweed, crabgrass, carpetweed, morning glory, pepper grass, ragweed and barnyard grass are obtained.

*Example 4*

1 - (3,4 - dichlorophenyl)-1-(2-hydroxyethyl)-3,3 - dimethylurea prepared in Example 2 is formulated in a powdered herbicidal concenarate adapted for use in the preparation of a spray using either an oil, water, or a combination of oil and water as a liquid diluent. The powdered concentrate is made by conventional mixing and grinding operations using the materials shown below in the weight proportions indicated.

| | |
|---|---|
| 1-(3,4-dichlorophenyl)-1-(2-hydroxyethyl)-3,3-dimethylurea | 70 |
| Alkylated aryl polyether alcohol (wetting and dispersing agent) | 4 |
| Fuller's earth | 26 |
| | 100 |

The herbicidal concentrate of this example is dispersed in diesel oil in the proportions of 5 pounds of the concentrate for each 50 gallons of the diesel oil. The resulting oil dispersion is applied to a drainage ditch at a dosage of 25 gallons of the spray composition per 1,000 square feet of area treated to kill and prevent regrowth for an extended period of aquatic weeds in the ditch and weeds and grasses on the banks of the ditch.

*Example 5*

1-(p-chlorophenyl)-1-(2-hydroxypropyl) - 3,3-dimethylurea is formulated in the form of pellets by intimately blending it with the several conditioning agents shown in the tabulation below in the weight proportions there shown, then adding water to form a thick paste, feeding the paste through a pellet extruder, and drying.

| | |
|---|---|
| 1-(p-chlorophenyl)-1-(2-hydroxypropyl)-3,3-dimethylurea | 10 |
| Sodium sulfate | 10 |
| Sodium salt of isopropyl naphthalene sulfonate (wetting agent) | 1 |
| Ca, Mg bentonite | 79 |
| | 100 |

The pellet formulation of this example is adapted for dispersion on contact with water. It is applied to water in amount sufficient to give a concentration of 10 p.p.m. of 1-(p-chlorophenyl)-1-(2-hydroxypropyl)-3,3-dimethylurea in ponds to give control of submerged pond weeds such as American pond weed, Sago pond weed, and Richardson's pond weed. This composition at a rate of 400 pounds per acre gives excellent control of a mixed population of annual weeds, broadleaf and grass weeds growing in a forest fire-break.

While the invention has been described with particular reference to specific embodiments, it will be appreciated that no unnecessary limitations are to be understood therefrom. The invention is not limited to the exact details shown and described for obvious modifications will occur to those skilled in the art.

This application is a continuation-in-part of our co-pending application Serial No. 730,069, filed April 22, 1958, now abandoned.

We claim:

A compound of the formula

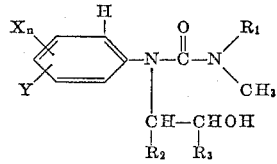

wherein X is selected from the group consisting of halogen; Y is hydrogen, alkyl of less than 5 carbons, and nitro; $n$ is a positive integer less than 3; $R_1$ is alkyl of less than 5 carbons; and $R_2$ and $R_3$ are selected from the group consisting of hydrogen and methyl, provided that at least one of $R_2$ and $R_3$ is hydrogen.

References Cited in the file of this patent

UNITED STATES PATENTS

| | | |
|---|---|---|
| 2,663,729 | Searle et al | Dec. 22, 1953 |
| 2,663,730 | Hill et al. | Dec. 22, 1953 |
| 2,704,245 | Searle | Mar. 15, 1955 |
| 2,705,195 | Cupery et al. | Mar. 29, 1955 |
| 2,723,192 | Todd | Nov. 8, 1955 |

FOREIGN PATENTS

| | | |
|---|---|---|
| 1,017,406 | Germany | Oct. 10, 1957 |

OTHER REFERENCES

Dains et al.: J. Amer. Chem. Soc., volume 47 (1925), page 1984.